US010140319B2

(12) United States Patent
Widjanarko et al.

(10) Patent No.: US 10,140,319 B2
(45) Date of Patent: Nov. 27, 2018

(54) SYSTEM FOR IDENTIFYING ANOMALIES BY AUTOMATICALLY GENERATING AND ANALYZING A STRUCTURE

(71) Applicant: Bank of America Corporation, Charlotte, NC (US)

(72) Inventors: Daniel D. Widjanarko, San Francisco, CA (US); Yarlagadda Anudeepa, Hyderabad (IN); Rudraraju Ramakrishnamraju, Hyderabad (IN); Belhekar Durgadatta, Mumbai (IN)

(73) Assignee: Bank of America, Charlotte, NC (US)

( * ) Notice: Subject to any disclaimer, the term of this patent is extended or adjusted under 35 U.S.C. 154(b) by 267 days.

(21) Appl. No.: 15/220,098

(22) Filed: Jul. 26, 2016

(65) Prior Publication Data

US 2018/0032554 A1 Feb. 1, 2018

(51) Int. Cl.
*G06F 17/30* (2006.01)

(52) U.S. Cl.
CPC .............................. *G06F 17/30294* (2013.01)

(58) Field of Classification Search
None
See application file for complete search history.

(56) References Cited

U.S. PATENT DOCUMENTS

| | | |
|---|---|---|
| 5,295,256 A | 3/1994 | Bapat |
| 5,603,025 A * | 2/1997 | Tabb ................. G06F 17/30014 |
| 6,453,452 B1 | 9/2002 | Chang et al. |
| 6,768,986 B2 | 7/2004 | Cras et al. |
| 7,181,440 B2 | 2/2007 | Cras et al. |
| 7,571,182 B1 | 8/2009 | Eddy |
| 7,664,777 B2 | 2/2010 | Cras et al. |
| 7,870,016 B2 | 1/2011 | Fazal et al. |
| 8,006,207 B2 | 8/2011 | Finkler |
| 9,305,076 B1 | 4/2016 | Kadarkarai |
| 2005/0065910 A1 | 3/2005 | Welton et al. |
| 2005/0080792 A1 | 4/2005 | Ghatare |
| 2006/0173873 A1 | 8/2006 | Prompt et al. |
| 2007/0027904 A1 | 2/2007 | Chow et al. |

(Continued)

OTHER PUBLICATIONS

Microsoft Business Intelligence and Data Warehousing, "Flattening a Parent-Child Hierarchy", Jan. 16, 2011, pp. 1-4.

(Continued)

*Primary Examiner* — Alex Gofman
*Assistant Examiner* — Umar Mian
(74) *Attorney, Agent, or Firm* — Michael A. Springs; Moore & Van Allen PLLC; Patrick B. Horne

(57) ABSTRACT

Embodiments of the invention are directed to a system, method, or computer program product for analyzing a data model and identifying anomalies within the data model. Data stored in a database is transformed into a data model by the invention, wherein the invention analyzes the data and generates relationships between tables and information contained within to generate the model. The data model itself is then analyzed in order to accurately identify anomalies such as ragged hierarchies, many-to-many issues, and/or double counting issues present in the data model which might affect the data integrity. Upon analyzing the data model, the invention compiles lists of discovered information and presents the results to a user in the form of a data analysis report.

20 Claims, 12 Drawing Sheets

(56) References Cited

U.S. PATENT DOCUMENTS

| | | |
|---|---|---|
| 2007/0239769 A1 | 10/2007 | Fazal et al. |
| 2008/0243876 A1 | 10/2008 | Godoy et al. |
| 2009/0319546 A1 | 12/2009 | Shaik |
| 2010/0106747 A1 | 4/2010 | Honzal et al. |
| 2011/0078201 A1* | 3/2011 | Ryan ................ G06F 17/30327 707/792 |
| 2011/0131173 A1 | 6/2011 | Fernandez Ortega |
| 2011/0295836 A1 | 12/2011 | Bolsius et al. |
| 2013/0232539 A1 | 9/2013 | Polunin et al. |
| 2014/0068718 A1 | 3/2014 | Mureinik |
| 2014/0279628 A1 | 9/2014 | Straznitskas |
| 2014/0310231 A1* | 10/2014 | Sampathkumaran ........................ G06F 17/30563 707/602 |
| 2015/0134598 A1* | 5/2015 | Banerjee ........... G06F 17/30592 707/607 |

OTHER PUBLICATIONS

Google Search "flattened hierarchy example", provided by US Patent Office on May 18, 2017, 1 page.
Results ACM DL Digital Library: "flattened hierarchy example", "ragged hierarchy", "unbalanced hierarchy", STIC, provided by US Patent Office on May 18, 2017, 2 pages.
ProQuest Dialog, Report Information from ProQuest Dialog, dated May 10, 2017, provided by US Patent Office, 5 pages.
Complete Main Concept Text, transform of a balanced hierarchy from a nonbalanced hierarchy, May 10, 2017, provided by US Patent Office, 2 pages.
IEEE Xplore Digital Library, search results, "flattened hierarchy", "ragged hierarchy", "unbalanced hierarchy", May 10, 2017, provided by US Patent Office, 1 page.

* cited by examiner

```
                                                    500
                                                   ↙

┌─────────────────────────────────────────────────────────────┐
│  DETERMINE THAT AN ELEMENT IN A COLUMN HAS A DIFFERENT      │
│   PARENT THAN THE OTHER ELEMENTS WITHIN THE COLUMN          │
│                         502                                  │
└─────────────────────────────────────────────────────────────┘
                              │
                              ▼
┌─────────────────────────────────────────────────────────────┐
│         DETERMINE THAT A CHILD HAS MORE THAN ONE PARENT      │
│                         504                                  │
└─────────────────────────────────────────────────────────────┘
                              │
                              ▼
┌─────────────────────────────────────────────────────────────┐
│    DETERMINE THAT A COLUMN APPEARS IDENTICALLY MORE THAN    │
│                         ONCE                                 │
│                         506                                  │
└─────────────────────────────────────────────────────────────┘
```

┌─────────────────────────────────────────────────────────┐
│  GENERATE A LIST OF THE COLUMNS OF THE TABLES ASSOCIATED │
│                  WITH THE DATA MODEL                     │
│                          602                             │
└─────────────────────────────────────────────────────────┘
                            ↓
┌─────────────────────────────────────────────────────────┐
│  GENERATE LIST OF TABLES THAT SHARE AT LEAST ONE COLUMN  │
│              WITH AT LEAST ANOTHER TABLE                 │
│                          604                             │
└─────────────────────────────────────────────────────────┘
                            ↓
┌─────────────────────────────────────────────────────────┐
│              GENERATE A LIST OF DATA ANOMALIES           │
│                          606                             │
└─────────────────────────────────────────────────────────┘
                            ↓
┌─────────────────────────────────────────────────────────┐
│              GENERATE A LIST OF PARENTS AND CHILDREN     │
│                          608                             │
└─────────────────────────────────────────────────────────┘
                            ↓
┌─────────────────────────────────────────────────────────┐
│   COMPILE THE LISTS OF COLUMNS, OTHER TABLES, DATA       │
│        ANOMALIES, AND PARENTS AND CHILDREN               │
│                          610                             │
└─────────────────────────────────────────────────────────┘
                            ↓
┌─────────────────────────────────────────────────────────┐
│             PRESENT DATA ANALYSIS REPORT TO USER         │
│                          612                             │
└─────────────────────────────────────────────────────────┘
```

*FIG. 6*

| Summary | |
|---|---:|
| Total Tables | 140 |
| Total Columns | 1365 |
| Attributes | 1105 |
| Facts | 260 |

| TABLE | COLUMN |
|---|---|
| LU_EMPLOYEE | EMP_FIRST_NAME |
| Monthly_Accomp_Stretto_Issue_CR_Tracker_writeback | Associate Name |
| Monthly_Accomp_Stretto_WeekSummary_writeback | Associate_person_number |
| Star_month | Month |

| Column | Tables |
|---|---|
| plant_id | plants_table,chemicals |
| RegID | M2Mtable,M2Mtable2 |

| Star Table | Star Column | Fact Table |
|---|---|---|
| CIT_Extract | Country | [Monthly_Accomp_Resource] |
| LU_CUSTOMER | ADDRESS | [mstr_userREAL_P_L] |
| LU_CUSTOMER | CUST_CITY_ID | [CITY_MNTH_SLS] |
| Star_month | Month_Of_Year | [CITY_MNTH_SLS] |
| LU_EMPLOYEE | CALL_CTR_ID | [SUBCATEG_MNTH_CTR_SLS] |
| Star_month | Year | [ZZMD00] |

*FIG. 11*

SYSTEM FOR IDENTIFYING ANOMALIES BY AUTOMATICALLY GENERATING AND ANALYZING A STRUCTURE

BACKGROUND

Business intelligence (BI) is generally a technology-based process for analyzing collected data to provide information to corporate executives, business managers, and the like allowing them to make informed business decisions. As data integrity of data models is pivotal for BI processes and tools, a need exists for accurately and efficiently analyzing data and identifying data anomalies.

BRIEF SUMMARY

Embodiments of the present invention address these and/or other needs by providing an innovative system, method and computer program product for generating a data model from a database, analyzing said data model for anomalies, and compiling and presenting a data analysis report to a user.

Embodiments of the invention relate to a system for automatically analyzing a data model and identifying anomalies within the data model, the system comprising: a memory device comprising computer-readable program code; a communication device; and a processing device operatively coupled to the memory device and the communication device, wherein the processing device is configured to execute the computer-readable program code to: based on input received from a graphical user interface, retrieve data comprising a plurality of elements and a plurality of tables, the data retrieved from a database; identify each element as a fact or a dimension based on at least one of a data type corresponding to the element, a column name corresponding to the element, and one or more constraints corresponding to the element; identify each of the tables associated with the data as either a fact table or a dimension table, wherein the plurality of tables comprises at least one fact table and at least one dimension table; determine that a set of elements within a single column of a first dimension table is a primary key for the dimension table by determining that each element of the set is unique to one another; identify a reference key corresponding to the primary key; based on identifying the reference key corresponding to the primary key, determine at least one relationship between at least two tables; generate a data model of the data retrieved from the database; identify data anomalies from the at least one relationship, wherein data anomalies are ragged hierarchies, many to many relationships, and double counting; generate a data analysis report comprising: generating a list of the columns of the tables associated with the data model, a list of other tables that share at least one column with the at least one dimension table, one or more lists of data anomalies, and a list of parents and children, wherein a child is a column associated with the reference key and a parent is a column associated with the primary key; compiling the list of columns, the list of other tables, the one or more lists of data anomalies, and the list of parents and children; and present the data analysis report to a user.

In some embodiments, identifying data anomalies further comprises: determining that an element in a column has a different parent than the other elements in the column; determining that a child has more than one parent; and determining that a column appears identically more than once on the list of columns.

In some embodiments, determining the at least one relationship between at least two tables further comprises determining relationships with up to four successive levels of hierarchical dimension tables from the at least at least one fact table.

In some embodiments, the successive levels of hierarchical dimension tables are merged into a single table in the data analysis report.

In some embodiments, the system may be used with any business intelligence reporting tool.

In some embodiments, the input received from the graphical user interface is transmitted electronically over a network from a user device as a control signal configured to represent the input.

In some embodiments, the data analysis report presented to the user is transmitted electronically to a user device over a network.

In some embodiments, the input received from the graphical user interface comprises a schema name, a database name, a host name, a port, a username, and a password.

Embodiments of the invention also relate to a computer program product for automatically analyzing a data model and identifying anomalies within the data model, the computer program product comprising at least one non-transitory computer-readable medium having computer-readable program code portions embodied therein, the computer-readable program code portions comprising: an executable portion configured for retrieving data comprising a plurality of elements and a plurality of tables, the data retrieved from a database based on input received from a graphical user interface; an executable portion configured for identifying each element as a fact or a dimension based on at least one of a data type corresponding to the element, a column name corresponding to the element, and one or more constraints corresponding to the element; an executable portion configured for identifying each of the tables associated with the data as either a fact table or a dimension table, wherein the plurality of tables comprises at least one fact table and at least one dimension table; an executable portion configured for determining that a set of elements within a single column of a first dimension table is a primary key for the dimension table by determining that each element of the set is unique to one another; an executable portion configured for identifying a reference key corresponding to the primary key; an executable portion configured for determining at least one relationship between at least two tables based on identifying the reference key corresponding to the primary key; an executable portion configured for generating a data model of the data retrieved from the database; an executable portion configured for identifying data anomalies, wherein data anomalies are ragged hierarchies, many to many relationships, and double counting; an executable portion configured for generating a data analysis report comprising: generating a list of the columns of the tables associated with the data model, a list of other tables that share at least one column with the at least one dimension table, one or more lists of data anomalies, and a list of parents and children, wherein a child is a column associated with the reference key and a parent is a column associated with the primary key; compiling the list of columns, the list of other tables, the one or more lists of data anomalies, and the list of parents and children; and an executable portion configured for presenting the data analysis report to a user.

In some embodiments, the computer program product includes an executable portion identifying data anomalies further comprising: determining that an element in a column has a different parent than the other elements in the column;

determining that a child has more than one parent; and determining that a column appears identically more than once on the list of columns.

In some embodiments, the computer program product includes an executable portion wherein determining the at least one relationship between at least two tables further comprises determining relationships with up to four successive levels of hierarchical dimension tables from the at least at least one fact table.

In some embodiments, the computer program product includes an executable portion wherein the successive levels of hierarchical dimension tables are merged into a single table in the data analysis report.

In some embodiments, the computer program product includes an executable portion allowing for the computer program product to be used with any business intelligence reporting tool.

In some embodiments, the computer program product includes an executable portion wherein the input received from the graphical user interface being transmitted electronically over a network from a user device as a control signal is configured to represent the input.

In some embodiments, the computer program product includes an executable portion wherein the data analysis report presented to the user is transmitted electronically to a user device over a network.

In some embodiments, the computer program product includes an executable portion wherein the input received from the graphical user interface comprises a schema name, a database name, a host name, a port, a username, and a password.

Embodiments of the invention further relate to a computer-implemented method for automatically analyzing a data model and identifying anomalies within the data, the method comprising: retrieving data comprising a plurality of elements and a plurality of tables, the data model retrieved from a database based on input received from a graphical user interface; identifying each element as a fact or a dimension based on at least one of a data type corresponding to the element, a column name corresponding to the element, and one or more constraints corresponding to the element; identifying each of the tables associated with the data as either a fact table or a dimension table, wherein the plurality of tables comprises at least one fact table and at least one dimension table; determining that a set of elements within a single column of a first dimension table is a primary key for the dimension table by determining that each element of the set is unique to one another; identifying a reference key corresponding to the primary key; determining at least one relationship between at least two tables based on identifying the reference key corresponding to the primary key; generating a data model of the data received from the database; identifying data anomalies, wherein data anomalies are ragged hierarchies, many to many relationships, and double counting; generating a data analysis report comprising: generating a list of the columns of the tables associated with the data model, a list of other tables that share at least one column with the at least one dimension table, one or more lists of data anomalies, and a list of parents and children, wherein a child is a column associated with the reference key and a parent is a column associated with the primary key; compiling the list of columns, the list of other tables, the one or more lists of data anomalies, and the list of parents and children; and presenting the data analysis report to a user.

In some embodiments, the computer-implemented method includes, identifying data anomalies further comprising: determining that an element in a column has a different parent than the other elements in the column; determining that a child has more than one parent; and determining that a column appears identically more than once on the list of columns.

In some embodiments, the computer-implemented method includes, determining the at least one relationship between at least two tables further comprises determining relationships with up to four successive levels of hierarchical dimension tables from the at least at least one fact table.

In some embodiments, the computer-implemented method includes, the successive levels of hierarchical dimension tables being merged into a single table in the data analysis report.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
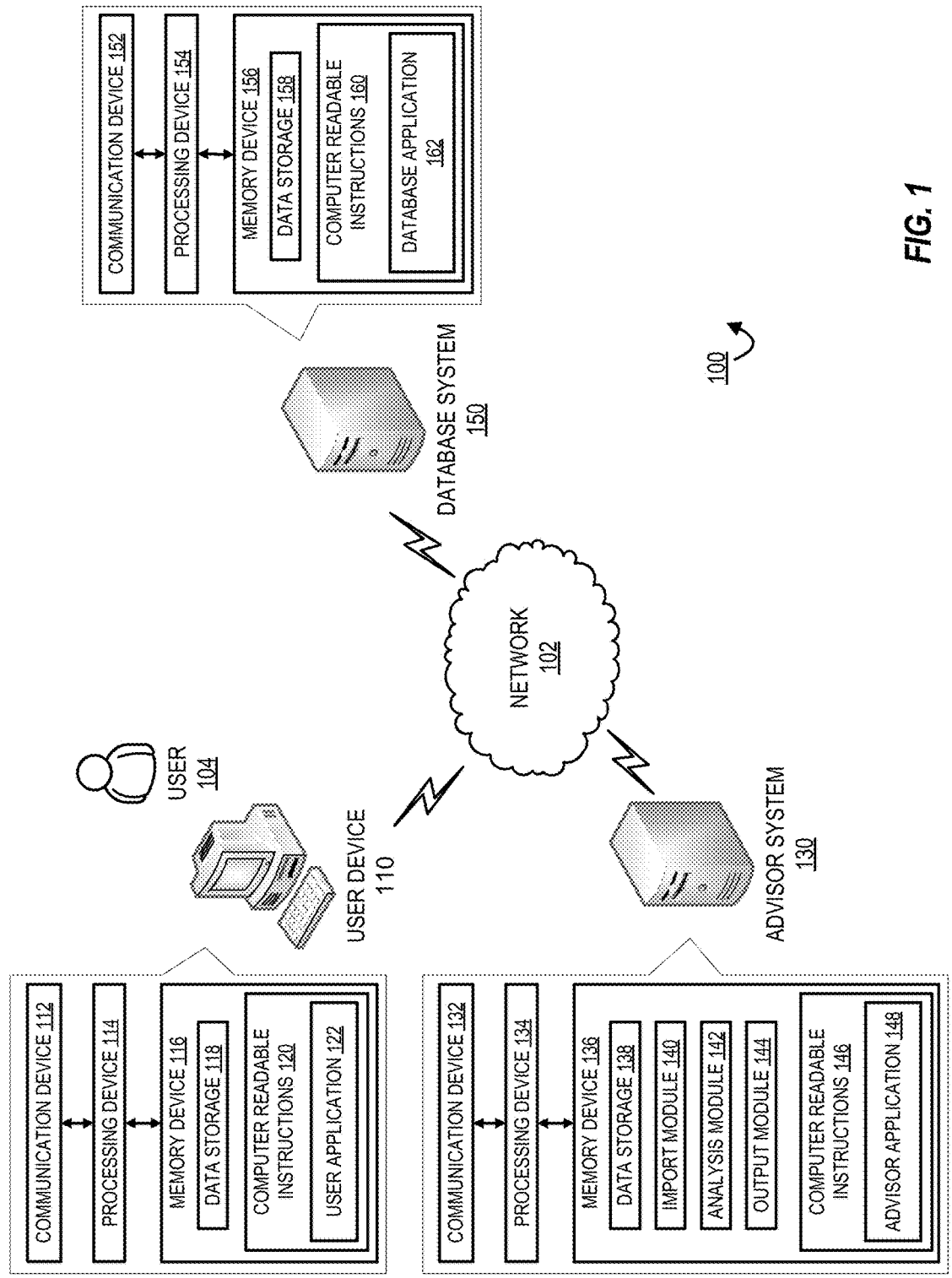
Figure 2:
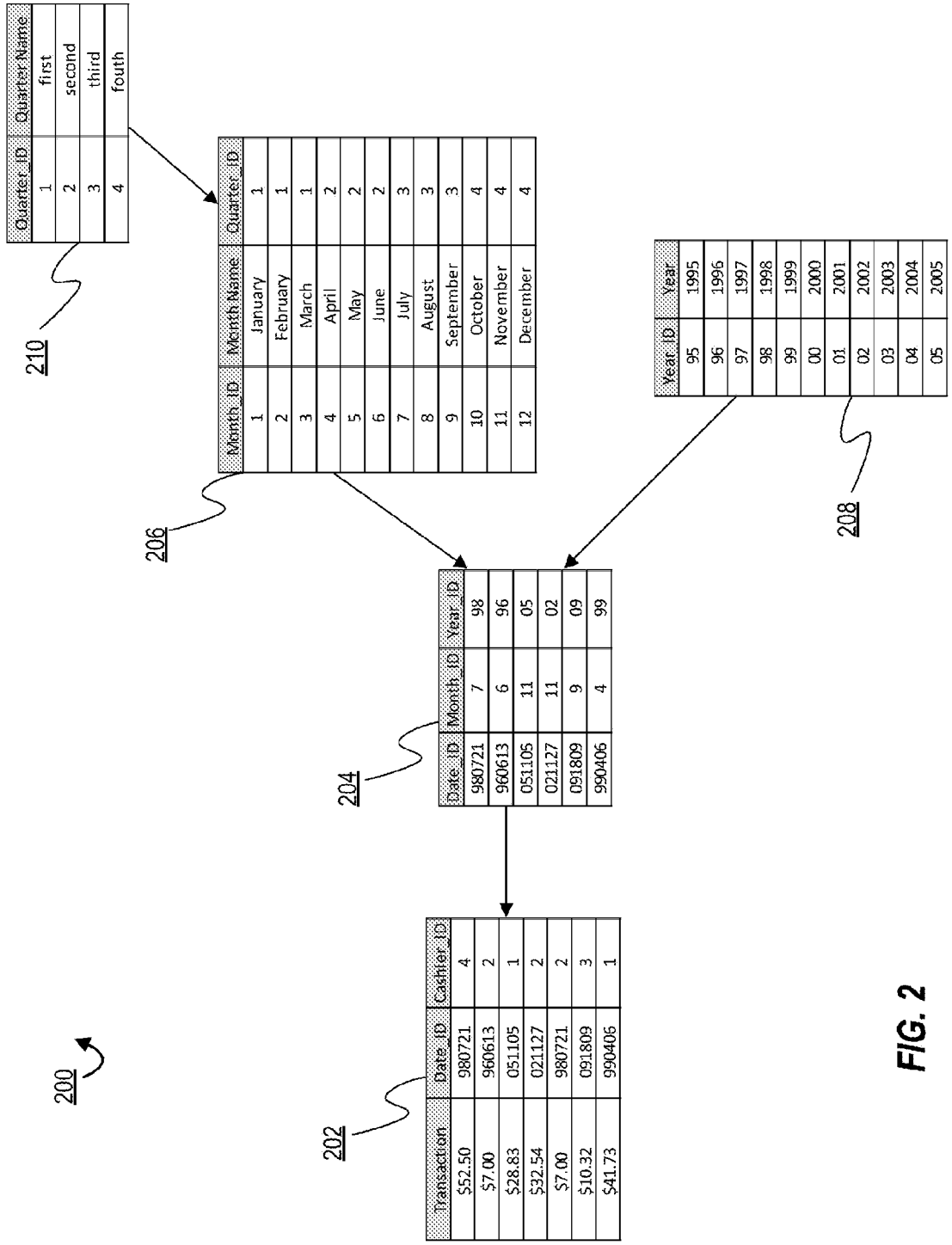
Figure 3:
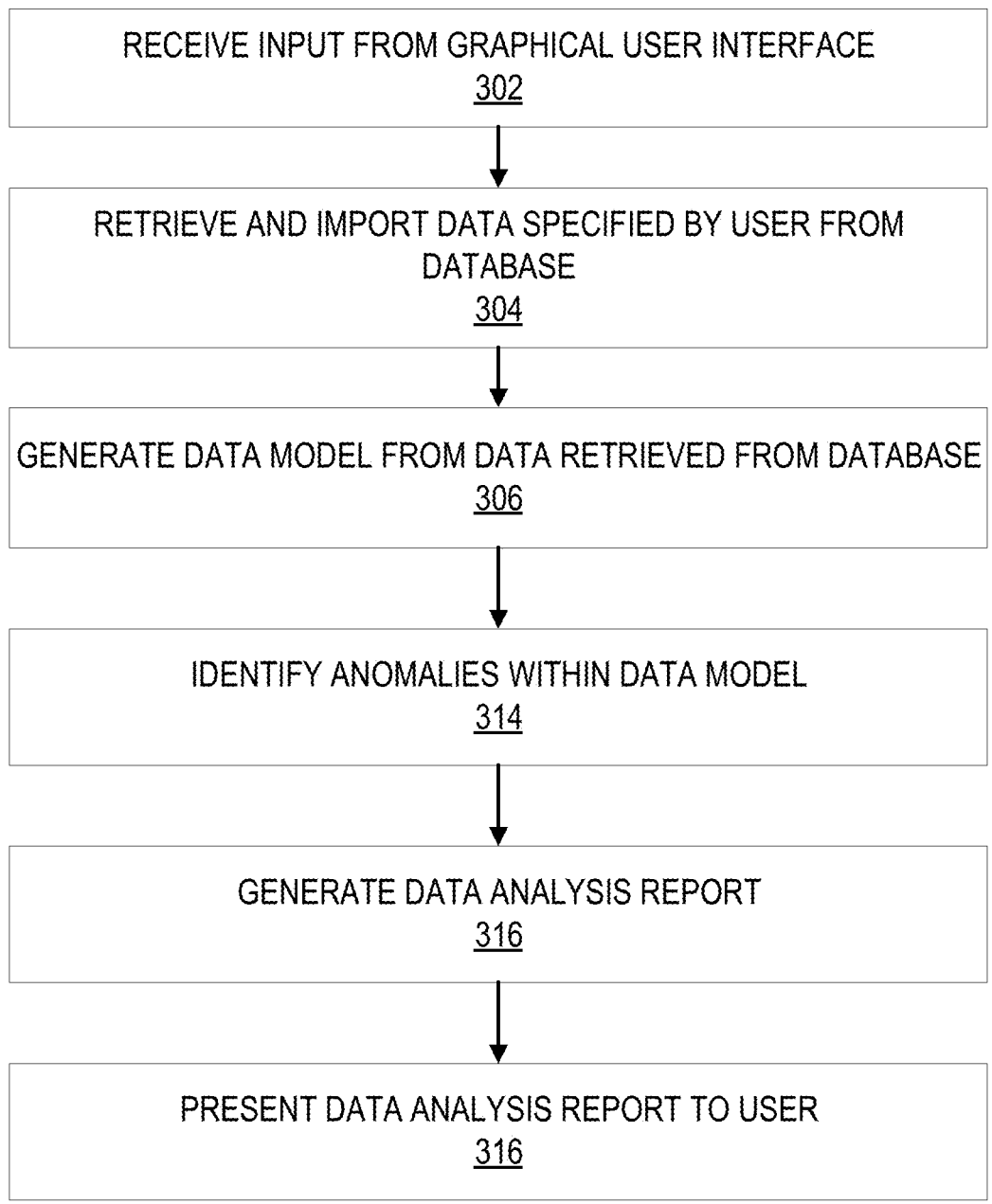
Figure 4:
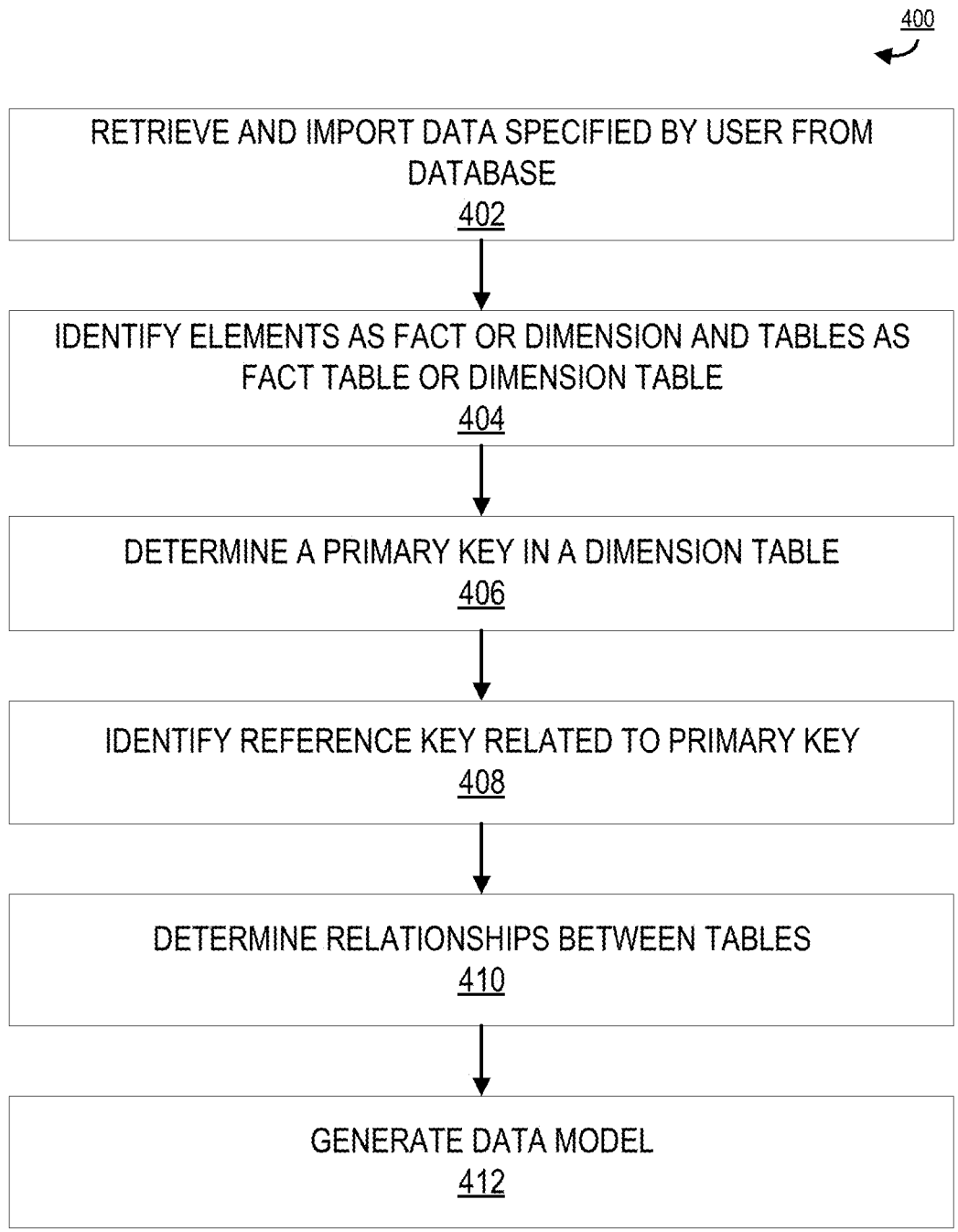
Figure 7:
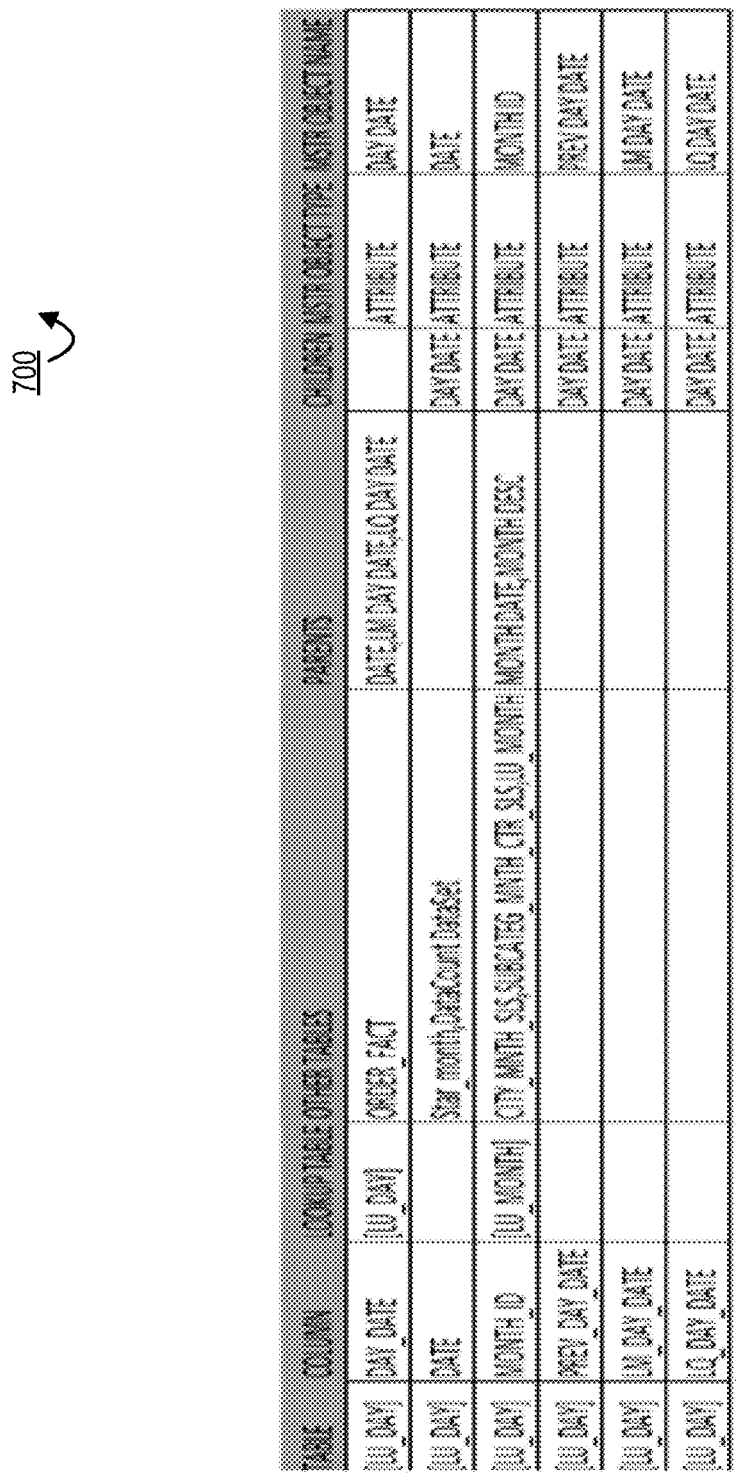
Figure 12:
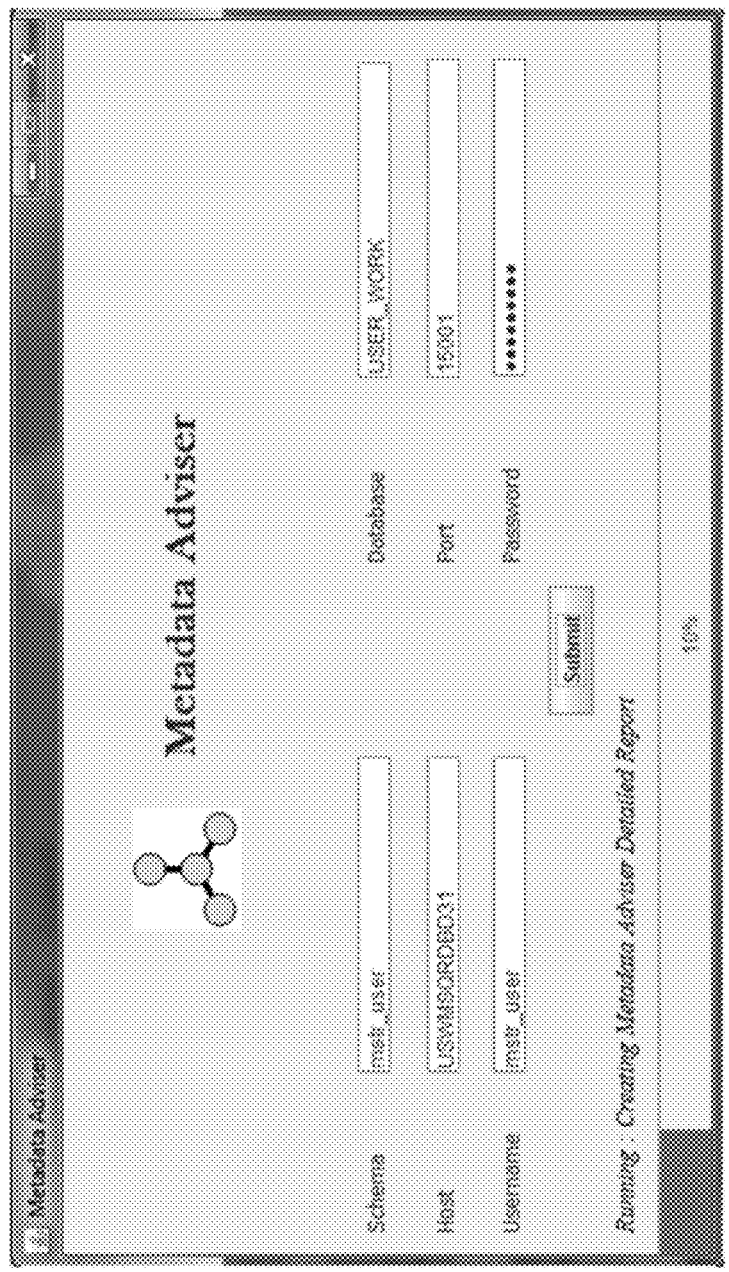

Having thus described embodiments of the invention in general terms, reference will now be made the accompanying drawings, wherein:

FIG. 1 provides a block diagram illustrating an advisor system and environment, in accordance with embodiments of the invention;

FIG. 2 provides a portion of an example snowflake schema;

FIG. 3 is a flowchart illustrating a method for generating and analyzing a data model from a database, in accordance with embodiments of the invention;

FIG. 4 is a flowchart illustrating a method for generating a data model from data retrieved from a database, in accordance with embodiments of the invention;

FIG. 5 is a flowchart illustrating a method for the identification of anomalies in a data model, in accordance with embodiments of the invention;

FIG. 6 is a flowchart illustrating a method for compiling data for an analysis report, in accordance with embodiments of the invention;

FIG. 7 presents an illustration of a generated analysis report, in accordance with embodiments of the invention;

FIG. 8 presents an illustration of a summary table contained within an analysis report, in accordance with embodiments of the invention;

FIG. 9 presents an illustration of a table of reported potential ragged hierarchy candidates, in accordance with embodiments of the invention;

FIG. 10 presents an illustration of a table of reported potential many-to-many relationship candidates, in accordance with embodiments of the invention;

FIG. 11 presents an illustration of reported doubled counting issues, in accordance with embodiments of the invention; and FIG. 12 presents an illustration of a metadata advisor application interface in progress, in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention provide a system and method for using a metadata advisor system to generate a data model from data contained in a database, analyze the data model, and identify potential data anomalies. Generally before beginning a project using any BI reporting tool or process, it is important to have an understanding of the underlying data model. Analysis of a data model requires scanning of the entire database containing the data associated with the model while identifying any potential relationships. In some cases, relationships between tables may not be already explicitly defined in the database. Currently, there is no standard and accurate tool for automatically analyzing a data model. The invention generates and analyzes a data model while identifying potential anomalies. Additionally, the invention may identify relationships between tables even when said relationships are not already created in the database. Furthermore, the invention is compatible and may be implemented with any BI tool or process.

FIG. 1 provides a block diagram illustrating an advisor system and environment 100, in accordance with an embodiment of the invention. As illustrated in FIG. 1, the environment 100 includes a user 104 where the user represents an individual or entity inputting information into the system to select a database for data model analysis. A user of the system may be a person, but may also be a business (e.g., a merchant) or any other entity.

The environment 100 also may include a user device 110 for use by the user 104 allowing the user to interact with the system. The user device 110 may be any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, mobile televisions, gaming devices, laptop computers, cameras, video recorders, audio/video player, radio, GPS devices, or any combination of the aforementioned.

The environment 100 may further include one or more database systems 150 which may be used to store data or information that the user 104 may wish access and analyze using the system as well as an advisor system 130 which may be used to analyze a data model generated from the database system 150 in response to input received from the user 104 via the user device 110.

In some embodiments of the invention, the user device 110, advisor system 130, and the one or more database systems 150 are configured to communicate over a network 102. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet.

In some embodiments of the invention, the one or more database systems 150 are configured to be controlled and managed by one or more third-party data providers (not shown), financial institutions, or other entities over the network 102. In other embodiments, the one or more database systems 150 are configured to be controlled and managed over the network 102 by the same entity that maintains the advisor system 130. In yet other embodiments, both the one or more database systems 150 and the advisor system 130 may be controlled and managed by a third-party or by controlled an managed separately by different third-parties. In other embodiments, the advisor system 130 and the database system 150 may be part of or contained within the user device 110, wherein operation of the system does not require the transmission and/or reception of information over the network 102 in order to carry out the function of the invention.

As further illustrated in FIG. 1, in some embodiments, the user device 110 generally comprises a communication device 112, a processing device 114, and a memory device 116, wherein the processing device 114 is operatively coupled to the communication device 112 and memory device 116. The processing device 114, and other processing devices described herein, generally include circuitry for implementing communication and/or logic functions of the user device 110 or other computing devices. For example, the processor 110 may include a digital signal processor device, a microprocessor device, and various analog to digital converters, digital to analog converters, and/or other support circuits. Control and signal processing functions of the user device 110 are allocated between these devices according to their respective capabilities. The processing device 110 thus may also include the functionality to encode and interleave messages and data prior to modulation and transmission. The processing device 110 can additionally include an internal data modem. Further, the processing 110 may include functionality to operate one or more software programs or applications, which may be stored in the memory device 116.

The communication device 112 included in the user device 110 generally comprises a modem, server, transceiver, and/or other device for communicating with other devices on the network 102; and/or a display, camera, keypad, mouse, keyboard, microphone, and/or speakers along with a user interface for communicating with one or more users. The processing device 114 is configured to use communication device 112 to transmit and/or receive data and/or commands to and/or from the other devices connected to the network 102.

The user device 110 further comprises the memory device 116 operatively coupled to the processing device 114, wherein the memory device 116 further comprises a data storage 118 and computer-readable instructions 120, which in some embodiments includes the computer-readable instructions 120 of a user application 122. As used herein, memory includes any computer readable medium (as defined herein below) configured to store data, code, instructions, or other information. The memory device 116 may include volatile memory, such as volatile Random Access Memory (RAM) including a cache area for the temporary storage of data. The memory device 116 may also include non-volatile memory, which can be embedded and/or may be removable. The non-volatile memory can additionally or alternatively include an electrically erasable programmable read-only memory (EEPROM), flash memory or the like.

Furthermore, as used herein, a "memory device" generally refers to a device or combination of devices that store one or more forms of computer-readable media and/or computer-executable program instructions/code which is described in greater detail below. For example, in one embodiment, the memory device 116 includes any computer memory that provides an actual or virtual space to temporarily or permanently store data and/or commands provided to the processing device 114 when it carries out its functions described herein.

In some embodiments, data imported from the database, input by the user via the GUI, and the like may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device.

The memory device 116 can store any of a number of applications which comprise computer-executable instructions/code executed by the processing device 116 to implement the functions of the user device 110 and/or one or more of the process/method steps described herein. For example, the memory device 116 may include such applications as the user application 122 which allows the user device 110 to communicate with the advisor system 130 and the database system 150 in order to receive input from the user 104 and transmit a request for analysis of a generated data model from a user-specified database. These applications also typically provide a graphical user interface (GUI) displayed by the user device 110 that allows the user 104 to communicate with the user device 110, the advisor system 130, the database system 150 and/or other devices or systems.

As used herein, a "user interface" generally includes a plurality of interface devices and/or software that allow a customer to input commands and data to direct the processing device to execute instructions. For example, graphical user interface (GUI) mentioned above may include an interface to input computer-executable instructions that direct the processing device 114 to carry out specific functions. The user interface employs certain input and output devices to input data received from the user 104 or output data to the user 104. These input and output devices may include a display, mouse, keyboard, button, touchpad, touch screen, microphone, speaker, LED, light, joystick, switch, buzzer, bell, and/or other customer input/output device for communicating with one or more customers.

As illustrated in FIG. 1, in some embodiments, the advisor system 130 generally comprises a communication device 132, a processing device 134, and a memory device 136, wherein the processing device 134 is operatively coupled to the communication device 132 and memory device 136. Further, the processing device 134 may include functionality to operate one or more software programs, modules, or applications, which may be stored in the memory device 136.

The communication device 132 included in the advisor system 130 generally comprises a modem, server, transceiver, and/or other device for communicating with other devices on the network 102, and/or a user interface for communicating with one or more users. The processing device 134 is configured to use communication device 132 to transmit and/or receive data and/or commands to and/or from the other devices connected to the network 102.

The advisor system 130 further comprises the memory device 136 operatively coupled to the processor 134, wherein the memory device 136 further comprises a data storage 138 and computer-readable instructions 140, which in some embodiments includes the computer-readable instructions 140 of an advisor application 142.

The memory device 136 can store any of a number of modules or applications which comprise computer-executable instructions/code executed by the processing device 136 to implement the functions of the advisor system 130 and/or one or more of the process/method steps described herein. For example, the memory device 136 may include such applications as the advisor application 142 which allows the advisor system 130 to communicate with the user device 110 and the database system 150 in order to process, at the request of the user 104 via the user device 110, a user-specified database stored in the database system 150 by employing an import module 140, an analysis module 142, and/or an output module 144 stored in the memory 136.

In some embodiments of the invention, the memory device 136 includes an import module 140. In some embodiments, the import module 140 imports and receives data from the database system 150. In some embodiments, the import module 140 receives data from the user device 110 and imports it into the system for manipulation. For example, the import module 140 may receive a link to a file that includes a database. In some embodiments, the import module 140 is configured to receive a link to an address on a computer network, such as an FTP or URL address. In some embodiments, the import module 140 is configured to access a database. The database may comprise tables, spreadsheets, and/or graphical depictions of the data and relationships in the database. In some embodiments, the import module 140 imports a database for use by the advisor system 130.

In some embodiments, the memory device 136 includes an analysis module 142. In some embodiments, the analysis module 142 takes the imported database and analyzes the data to identify the elements in the database as well as the relationships between the elements in the database. In an exemplary embodiment, elements are the data that make up the database. The analysis module 142 is configured to identify the elements and the relationships between the elements in a database. In some embodiments, the analysis module 142 also determines the level at which one or more elements fits into the hierarchy.

In some embodiments, the decision engine includes an output module 144. In some embodiments, the output module 144 generates a data analysis report. For example, a report may be displayed as a spreadsheet or table that is able to be downloaded or transferred for further analysis. In some embodiments of the invention, the output module 144 generates and provides a graphical depiction of the constructed data model generated by the system.

As further illustrated in FIG. 1, in some embodiments, the database system 150 generally comprises a communication device 152, a processing device 154, and a memory device 156, wherein the processing device 154 is operatively coupled to the communication device 152 and memory device 156. Further, the processing device 154 may include functionality to operate one or more software programs or applications, which may be stored in the memory device 156.

The communication device 152 included in the database system 150 generally comprises a modem, server, transceiver, and/or other device for communicating with other devices on the network 102, and/or a user interface for communicating with one or more users. The processing device 154 is configured to use communication device 152 to transmit and/or receive data and/or commands to and/or from the other devices connected to the network 102.

The database system 150 further comprises the memory device 156 operatively coupled to the processor 154, wherein the memory device 156 further comprises a data storage 158 and computer-readable instructions 160, which in some embodiments includes the computer-readable instructions 160 of a database application 162. It should be understood that the memory device 156 may include one or more databases or other data structures/repositories.

The memory device 156 can store any of a number of applications which comprise computer-executable instructions/code executed by the processing device 156 to implement the functions of the database system 150 and/or one or more of the process/method steps described herein. For example, the memory device 156 may include such applications as the database application 162 which allows the database system 150 to communicate with the user device 110 and the advisor system 130 in order to retrieve, at the request of the user 104 via the user device 110, a user-specified database stored in the database system 150 and provide the database to the advisor system 130 for processing and analysis.

In some embodiments of the invention, the user device 110 comprises the advisor system 130 and/or the database system 150 and thus further includes the advisor application 142 and/or the database application 162 allowing the system to function locally within the user device 110 without requiring communication of the user device 110, the advisor system 130, and the database system 150 over the network 102.

FIG. 2 provides a portion of an example data model 200 which will be used to discuss the following concepts. Data warehousing is the process of collecting data from various systems into a centralized database or repository. Data stored within a database or data warehouse may be in the form of a fact or a dimension. A fact, also referred to as a measure, is a measurable event typically with some quantitative value. For example, a business may collect information regarding income earned from transactions. Table 202 of FIG. 2 illustrates a column labeled "Transaction" which contains amounts of income collected in USD as a result of several individual transactions. In this example, amounts of income earned from the transactions are stored as a fact.

A dimension, also referred to as an attribute, describes the measurable event and contains reference information about a fact. In the previous example and as illustrated in table 204 of FIG. 2, a dimension further describing the income earned from transactions could be time related, wherein the date associated with the individual transactions is collected and used to further describe the transaction amounts. An additional example of a dimension could be an identifier indicating which employee of the business completed the transaction.

Facts and dimensions are stored within a data warehouse or database within fact tables and dimension tables respectively. A fact table stores the quantitative information, or facts, to be analyzed as columns within the fact table, while a dimension table organizes the descriptive attributes, or dimensions, in columns within the dimension table. Table 202 of FIG. 2 illustrates a fact table containing transaction amounts collected by a business, while table 204 illustrates a dimension table further describing the information contained within the associated fact table. In addition to quantitative information, fact tables, such as table 202, contain additional columns used to create relationships to dimension tables.

Relationships between fact tables and dimension tables are generated by including a key in each of the tables, wherein a foreign, or reference, key on the fact table calls to a primary key on the dimension table which contains further descriptive information regarding the foreign key. For example, in FIG. 2, the fact table 202 contains a column labeled "Date_ID" which acts as a foreign key corresponding to the "Date_ID" column which acts as a primary key in dimension table 204 which further describes information within the fact table 202. All elements within a column must be unique to one another in order for the column to be used as a primary key.

The relationships formed between tables are known as parent-child relationships, wherein a child contains the foreign key and references a parent table containing the corresponding primary key. The child "inherits" the values and information contained within the parent table. In FIG. 2, table 202 is a child of table 204 as table 202 refers back to table 204 and inherits the information contained within it.

Furthermore, a dimension table may call to additional dimension tables through the same method. As illustrated in FIG. 2, both dimension tables 206 and 208 further describe dimension table 204. Moreover, as illustrated in FIG. 2, table 210 provides yet another level of complexity to schema by acting as a parent to table 206.

Tables are structured into a data model known as a schema which logically organizes the tables and the relationships that they have to one another. The simplest form of schema, a star schema, is diagramed by surrounding a central fact table with all related dimension tables which further describe said fact table. The simplicity of the star schema allows for faster performance and query times of large data sets as there is only a single level of dimension tables above the fact table, however due to the restriction of a single level of dimension tables, updating the oftentimes large data sets can lead to the creation of anomalies, a results that may be circumvented through the use of normalization.

A normalized star schema, known as a snowflake schema, employs multiple levels of dimension tables branching out from a fact table in order to decompose a large table into multiple, smaller tables experiencing less redundancy without losing information. As previously discussed, the expanded series of dimension tables act as parent tables and link data back to related child tables by defining foreign keys in the children which reference primary keys in the parents. While snowflake schema have slower performance than star schema due to the more complex nature of their design, snowflake schema isolate data allowing for additions, deletions, and modifications of an attribute to a data set can be performed in a single table with the update then automatically and easily propagated through the rest of the data model using the defined foreign-primary key sets. The example data model 200 is an example of a portion of a snowflake schema, as there are multiple levels of dimension tables with dimension tables acting as parents to other dimension tables.

It should be noted that FIG. 2 illustrates merely a portion of a simplified data model to be used as an example to describe basic concepts of data warehousing. Actual schema may be a more complex, interconnected network of tables and data with multiple related tables branching off of multiple facts tables.

Referring now to FIG. 3, a flowchart illustrating a method for generating and analyzing a data model from a database 300, in accordance with embodiments of the invention is shown. As illustrated by block 302, input is first received by the system from the user 104 via a graphical user interface (GUI), the input specifying data to be analyzed by the system. In some embodiments of the invention, the GUI prompts the user to input information in order to utilize the functions of the system. In some embodiments, the GUI is presented to the user 104 on the user device 110 and a command signal is transmitted over the network 102 to cause the database system 150 and the advisor system 130 to execute one or more tasks such as, respectively, retrieving a database and importing the data to generate and analyze a data mode. In other embodiments of the invention, two or more of the user device 104, the database system 150, and the advisor system 130 are combined into a single device wherein the network 102 is not required in order to transmit a command signal with instructions for executing a task, instead the signal being sent locally. In some embodiments, the GUI is a Java-based application. In other embodiments, the GUI is based in other programming languages such as C++ or the like. The contents of the GUI is further discussed below in detail with respect to FIG. 6.

As illustrated in block 304 of FIG. 3, the system retrieves and imports data from the user-specified database stored in the database system 150 to the advisor system 130 based on the input received from the user 104 via the GUI. In some embodiments, the import module 140 imports and receives data from the database system 150. In other embodiments, the import module 140 receives data from the user device 110 and imports it into the advisor system 130 for manipulation. For example, the import module 140 may receive a link to a file that includes a database. In some embodiments, the import module 140 is configured to receive a link to an address on a computer network, such as an FTP or URL address. In some embodiments, the import module 140 is configured to access a database. The database may comprise tables, spreadsheets, and/or graphical depictions of the data and relationships in the database. In some embodiments of the invention, the system retrieves and imports data from a single database. In other embodiments, the system is able to retrieve and import data from multiple databases either separately or simultaneously. In some embodiments, the system is able to retrieve, import, and combine data from multiple databases into a unified format. In other embodiments, the system is able to manage data retrieved and imported from multiple databases separately.

In some embodiments, the data in the database includes elements and/or relationships between elements within a hierarchy. The elements are the data that the database is intended to organize. For example, elements may be individuals in a corporate structure hierarchy, or information in an inventory database. The information regarding the elements may also include the position of the elements in the hierarchy. In some embodiments, database may also include information regarding the relationships between the elements in the hierarchy.

In some embodiments, the system imports the data from the database upon request of the user. In some embodiments, the system automatically imports databases on a regular schedule or upon a triggering event. For example, a system may monitor a database that is constantly or frequently being updated, such as a stock database or a transactional database.

As illustrated in block 306 of FIG. 3, after the data is imported into the advisor system 130 from the database system 150, the advisor system 130 generates a data model. In some embodiments, the analysis module 142 is configured to perform any steps related to analysis, identification elements, and/or generation of lists as performed by the system. The generation of the data model is further illustrated in FIG. 4. As illustrated in FIG. 4, which provides a high level process flow for generating a data model, after retrieving and importing the user-specified data as illustrated again in block 402, the advisor system 130 identifies the elements of the data as facts and dimension in order to identify tables within the database as either a fact or dimension table as illustrated in block 404. In some embodiments, the system at least partially identifies elements in tables as facts or dimensions based on the name of the column containing the element. For example, a column in a table labeled "Revenue" may be identified as a fact given the title of the column relates to a quantitative measurement. In some embodiments, the system identifies column names based off of list of terms commonly associated with data identified as facts.

In some embodiments, the system at least partially identifies elements as facts and dimensions according to the data type of the element using logic, an algorithm, or the like. For example, it the system identifies the element as qualitative, non-numerical data element such as a word or date entry, the system would identify the element as a dimension as opposed to a fact. In some embodiments, the system identifies elements based on database constraints which set rules for elements within the database. For example, a column may have a constraint which limits elements entered into a column to only be "Red" or "Blue." From this constraint, the system is able to identify the elements within the column as dimensions.

As illustrated in block 406 of FIG. 4, the advisor system 130 determines elements within the database that may potentially be used as primary keys to create relationships to other tables in the data model. In some embodiments, primary keys are identified by determining that all elements within a column of a table are unique to one another, wherein the same value is not repeated within the column.

As illustrated in block 408, the advisor system 130 next identifies elements within the database which act as foreign keys corresponding to the determined primary keys. In some embodiments, the system identifies elements as foreign keys by identifying a column label that corresponds to a column label of a primary key on a different table.

As illustrated in block 410 of FIG. 4, relationships between fact and dimension tables are determined by the advisor system 130. In some embodiments, the system uses the matched sets of primary keys and foreign keys to determine relationships between tables. In some embodiments, the advisor system 130 analyzes and evaluates each line in a spreadsheet or table. In some embodiments, the system evaluates more than one spreadsheet or table, such as a spreadsheet for each level of a hierarchy or a spreadsheet that discloses the entities and a spreadsheet that discloses the relationships between entities. In some embodiments, each element is identified, the location of each element in the database is ascertained, and the relationships between each element to at least one other element are determined. In some embodiments, the advisor system 130 captures each element based on textual analysis. For example, comparison of element name and/or a ID number may be used to identify unique elements within the database. In some embodiments, the system identifies elements based on a graphical depiction of the hierarchy analyze module.

As illustrated in block 412, the advisor system 130 generates a data model of the data contained in the database based on the analysis of the database executed in blocks 402-410. In some embodiments, the generated data model is in the form of a snowflake schema. In some embodiments, a generated snowflake schema possesses up to four successive levels of hierarchical dimension tables from at least one fact table. In other embodiments of the invention, the generated data model is in the form of a star schema.

Referring now back to FIG. 3, as illustrated in block 314, the advisor system 130 identifies anomalies within the generated data model. Anomalies are errors in the data integrity of the data model that lead to unexpected or non-normal behavior. Examples of potential anomalies include ragged hierarchies, many-to-many relationships, and double counting. A ragged hierarchy is a hierarchy with an uneven number of levels wherein at least one element within a column does not share the same direct parent as the rest of the elements within the column. For example, in a hierarchy of country, state, city, some cities may be independent territories of the country and therefore not have a state associated with them such as New Delhi which is a city in the country of India that does not have a state associated with it. Many-to-many relationships may lead to anomalies due to the complex nature of the relationship. In a many-to-many relationship, two tables reference one another. This relationship is often modeled with an intermediary junction table that exists between the two tables and relates them to one another. In this case, the intermediary junction table is a child to both tables within the many-to-many relationship. Double counting occurs when due to data model design, an element of the data is count more than once.

The identification of anomalies within the generated data model is further illustrated in FIG. 5. As illustrated in FIG. 5, which provides a high level process flow for identifying anomalies 500, the advisor system 130 as illustrated in block 502 analyzes the data model to determine the presence of a ragged hierarchy by determining if an element within a column of the generated data model has a different direct parent than the other elements within the same column. In some embodiments of the invention, the data stored in the database may contain an identifier indication the position of a ragged hierarchy.

As illustrated in block 504 of FIG. 5, the advisor system 130 identifies many-to-many relationships within the generated data model by determining any tables that have more than one parent and determining any potential anomalies created by the complex relationship. The advisor system 103 also determines any columns that may appear identically more than once in the data model in order to identify double counting anomalies as illustrated in block 506.

Referring now back to FIG. 3, as illustrated in block 316, the advisor system 130 generates a data analysis report after generating and analyzing the data model. The generation of the data analysis report is further illustrated in FIG. 6. As illustrated in block 602 of FIG. 6 which provides a high level process flow for generating the analysis report 600, the advisor system 130 generates a list of all columns on the tables associated with the data model. In some embodiments, the system also generates a summary table containing a total number of tables, a total number of columns, a total number of facts, and a total number of attributes contained within the data model. In some embodiments, the output module 144 is configured to generate the data analysis report and/or any information presented to the user following the analysis of the data model.

As illustrated in block 604 of FIG. 6, for each column, the advisor system 130 generates a list of other tables in the data model which also contain the column. Additionally the system generates a list of the data anomalies and a list of parents and children determined from the analysis of the data model as illustrated in blocks 606 and 608 of FIG. 6 respectively.

Next, as illustrated in block 610, the system compiles the lists of the columns, other tables, data anomalies, and parents and children to generate a data analysis report. In some embodiments of the invention, the aforementioned lists are compiled into a single table or spreadsheet. In other embodiments, a report of the data anomalies is generated using the list of data anomalies, wherein each type of anomaly is reported separately in its own table or spreadsheet.

Finally, the data analysis report is presented to the user as illustrated in block 614 of FIG. 6 as well as block 318 of FIG. 3. In some embodiments, the data analysis report comprises a complied list of columns, other tables, and parents and children with additional information such as element type and element name and the like as illustrated in FIG. 7. In some embodiments the data analysis report comprises a single table, list, or spreadsheet compiling all collected analysis information. In some embodiments, a summary report containing a total number of tables, a total number of columns, a total number of facts, and a total number of attributes is presented to the user as part of or in addition to the data analysis report as illustrated in FIG. 8. In some embodiments, tables containing potential ragged hierarchies, many-to-many relationship issues, and double counting issues are presented to the user in tables as illustrated in FIGS. 9-11 respectively.

In some embodiments of the invention, the data analysis report is transmitted to the user device 110 for delivery to the user 104. In some embodiments, data analysis report may be a file that can be downloaded or transferred to another computing system for further analysis. In some embodiments, the advisor system 130 transforms the analysis report into a user-requested file format.

FIG. 12 presents an illustration of an advisor application interface in progress 1200 according to some embodiments of the invention. As illustrated in the FIG. 12, in some embodiments of the invention, the user 104 is prompted by the system to input a schema name, database, host, port, username, and password in order to securely access the system and analyze data stored in the database system 150.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein.

Moreover, it should be understood that the process flows described herein include transforming the information sent and/or received from the applications of the different systems (e.g., internally or externally) and/or the devices from one or more data formats into a data format associated with the application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automatically analyzing a data model and identifying anomalies within the data model, the system comprising:
    a memory device comprising computer-readable program code;
    a communication device; and
    a processing device operatively coupled to the memory device and the communication device, wherein the processing device is configured to execute the computer-readable program code to:
    based on input received from a graphical user interface, retrieve data comprising a plurality of elements and a plurality of tables, the data retrieved from a database;
    identify elements within the plurality of tables as facts or dimensions by analyzing the elements and the plurality of tables based on a data type corresponding to the elements, a column name corresponding to the elements, and one or more constraints corresponding to the elements within the plurality of tables, wherein identifying the elements comprises:
        identifying when the elements comprise a qualitative non-numerical data type and identifying the elements as the dimensions, and identifying when the elements have a quantitative numerical type and identifying the elements as the facts;
        identifying when the column name of the elements meet a list of terms stored as associated with the facts or the dimensions and identifying the elements as the facts or the dimensions based on the lists of terms; and
        identifying when the one or more constraints comprise rules that limit the elements to entries that are the facts or the dimensions based on the rules and identifying the elements as the facts or the dimensions based on the rules;
    identify each of the tables associated with the data as either a fact table or a dimension table based on identifying the elements within the tables as the facts or the dimensions, wherein the plurality of tables comprises at least one fact table and at least one dimension table;
    determine that a set of elements within a single column of a first dimension table is a primary key for the dimension table by determining that each element of the set is unique to one another;
    identify a reference key corresponding to the primary key;
    based on identifying the reference key corresponding to the primary key, determine at least one relationship between at least two tables;
    generate the data model of the data retrieved from the database;
    identify data anomalies from the at least one relationship, wherein data anomalies are ragged hierarchies, many to many relationships, and double counting;
    generate a data analysis report comprising:
        generating a list of columns of the tables associated with the data model, a list of other tables that share at least one column with the at least one dimension table, one or more lists of data anomalies, and a list of parents and children, wherein a child is a column associated with the reference key and a parent is a column associated with the primary key;
        compiling the list of the columns, the list of other tables, the one or more lists of data anomalies, and the list of parents and children; and
    present the data analysis report to a user.

2. The system of claim 1, wherein identifying data anomalies further comprises:
    determining that an element in a first column has a different parent than other elements in the first column;
    determining that at least one child column has more than one parent; and
    determining that a second column appears identically more than once on the list of columns.

3. The system of claim 1, wherein determining the at least one relationship between at least two tables further comprises determining relationships with up to four successive levels of hierarchical dimension tables from the at least one fact table.

4. The system of claim 3, wherein the successive levels of hierarchical dimension tables are merged into a single table in the data analysis report.

5. The system of claim 1, wherein the system may be used with any business intelligence reporting tool.

6. The system of claim 1, wherein the input received from the graphical user interface is transmitted electronically over a network from a user device as a control signal configured to represent the input.

7. The system of claim 1, wherein the data analysis report presented to the user is transmitted electronically to a user device over a network.

8. The system of claim 1, wherein the input received from the graphical user interface comprises a schema name, a database name, a host name, a port, a username, and a password.

9. A computer program product for automatically analyzing a data model and identifying anomalies within the data model, the computer program product comprising at least one non-transitory computer-readable medium having computer-readable program code portions embodied therein, the computer-readable program code portions comprising:

an executable portion configured for retrieving data comprising a plurality of elements and a plurality of tables, the data retrieved from a database based on input received from a graphical user interface;

an executable portion configured for identifying elements within the plurality of tables as facts or dimensions by analyzing the elements and the plurality of tables based on a data type corresponding to the elements, a column name corresponding to the elements, and one or more constraints corresponding to the elements within the plurality of tables, wherein identifying the elements comprises:

identifying when the elements comprise a qualitative non-numerical data type and identifying the elements as the dimensions, and identifying when the elements have a quantitative numerical type and identifying the elements as the facts;

identifying when the column name of the elements meet a list of terms stored as associated with the facts or the dimensions and identifying the elements as the facts or the dimensions based on the lists of terms; and identifying when the one or more constraints comprise rules that limit the elements to entries that are the facts or the dimensions based on the rules and identifying the elements as the facts or the dimensions based on the rules;

an executable portion configured for identifying each of the tables associated with the data as either a fact table or a dimension table based on identifying the elements within the tables as the facts or the dimensions, wherein the plurality of tables comprises at least one fact table and at least one dimension table;

an executable portion configured for determining that a set of elements within a single column of a first dimension table is a primary key for the dimension table by determining that each element of the set is unique to one another;

an executable portion configured for identifying a reference key corresponding to the primary key;

an executable portion configured for determining at least one relationship between at least two tables based on identifying the reference key corresponding to the primary key;

an executable portion configured for generating the data model of the data retrieved from the database;

an executable portion configured for identifying data anomalies, wherein data anomalies are ragged hierarchies, many to many relationships, and double counting;

an executable portion configured for generating a data analysis report comprising:

generating a list of columns of the tables associated with the data model, a list of other tables that share at least one column with the at least one dimension table, one or more lists of data anomalies, and a list of parents and children, wherein a child is a column associated with the reference key and a parent is a column associated with the primary key;

compiling the list of the columns, the list of other tables, the one or more lists of data anomalies, and the list of parents and children; and an executable portion configured for presenting the data analysis report to a user.

10. The computer program product of claim 9, wherein identifying data anomalies further comprises:

determining that an element in a first column has a different parent than other elements in the first column;

determining that at least one child column has more than one parent; and determining that a second column appears identically more than once on the list of columns.

11. The computer program product of claim 9, wherein determining the at least one relationship between at least two tables further comprises determining relationships with up to four successive levels of hierarchical dimension tables from the at least one fact table.

12. The computer program product of claim 11, wherein the successive levels of hierarchical dimension tables are merged into a single table in the data analysis report.

13. The computer program product of claim 9, wherein the computer program product may be used with any business intelligence reporting tool.

14. The computer program product of claim 9, wherein the input received from the graphical user interface is transmitted electronically over a network from a user device as a control signal configured to represent the input.

15. The computer program product of claim 9, wherein the data analysis report presented to the user is transmitted electronically to a user device over a network.

16. The computer program product of claim 9, wherein the input received from the graphical user interface comprises a schema name, a database name, a host name, a port, a username, and a password.

17. A computer-implemented method for automatically analyzing a data model and identifying anomalies within the data model, the method comprising:

retrieving data comprising a plurality of elements and a plurality of tables, the data retrieved from a database based on input received from a graphical user interface;

identifying elements within the plurality of tables as facts or dimensions by analyzing the elements and the plurality of tables based on a data type corresponding to the elements, a column name corresponding to the elements, and one or more constraints corresponding to the element within the plurality of tables, wherein identifying the elements comprises:

identifying when the elements comprise a qualitative non-numerical data type and identifying the elements as the dimensions, and identifying when the elements have a quantitative numerical type and identifying the elements as the facts;

identifying when the column name of the elements meet a list of terms stored as associated with the facts or the dimensions and identifying the elements as the facts or the dimensions based on the lists of terms; and identifying when the one or more constraints comprise rules that limit the elements to entries that are the facts or the dimensions based on the rules and identifying the elements as the facts or the dimensions based on the rules;

identifying each of the tables associated with the data as either a fact table or a dimension table based on identifying the elements within the tables as the facts or the dimensions, wherein the plurality of tables comprises at least one fact table and at least one dimension table;

determining that a set of elements within a single column of a first dimension table is a primary key for the dimension table by determining that each element of the set is unique to one another;

identifying a reference key corresponding to the primary key;

determining at least one relationship between at least two tables based on identifying the reference key corresponding to the primary key;

generating the data model of the data retrieved from the database;

identifying data anomalies, wherein data anomalies are ragged hierarchies, many to many relationships, and double counting;

generating a data analysis report comprising:
  generating a list of columns of the tables associated with the data model, a list of other tables that share at least one column with the at least one dimension table, one or more lists of data anomalies, and a list of parents and children, wherein a child is a column associated with the reference key and a parent is a column associated with the primary key;
  compiling the list of the columns, the list of other tables, the one or more lists of data anomalies, and the list of parents and children; and
presenting the data analysis report to a user.

18. The computer-implemented method of claim 17, wherein identifying data anomalies further comprises:
  determining that an element in a first column has a different parent than other elements in the first column;
  determining that at least one child column has more than one parent; and
  determining that a second column appears identically more than once on the list of columns.

19. The computer-implemented method of claim 17, wherein determining the at least one relationship between at least two tables further comprises determining relationships with up to four successive levels of hierarchical dimension tables from the at least one fact table.

20. The computer-implemented method of claim 19, wherein the successive levels of hierarchical dimension tables are merged into a single table in the data analysis report.

* * * * *